United States Patent
Fang

(10) Patent No.: US 9,824,267 B2
(45) Date of Patent: Nov. 21, 2017

(54) WRITING BOARD DETECTION AND CORRECTION

(71) Applicant: Konica Minolta Laboratory U.S.A., Inc., San Mateo, CA (US)

(72) Inventor: Gang Fang, San Bruno, CA (US)

(73) Assignee: Konica Minolta Laboratory U.S.A., Inc., San Mateo, CA (US)

(*) Notice: Subject to any disclaimer, the term of this patent is extended or adjusted under 35 U.S.C. 154(b) by 0 days.

(21) Appl. No.: 14/975,531

(22) Filed: Dec. 18, 2015

(65) Prior Publication Data

US 2017/0177931 A1    Jun. 22, 2017

(51) Int. Cl.
| | | |
|---|---|---|
| G06K 9/00 | (2006.01) | |
| G06K 9/52 | (2006.01) | |
| G06K 9/62 | (2006.01) | |
| G06T 3/40 | (2006.01) | |
| G06K 9/46 | (2006.01) | |
| G06T 7/00 | (2017.01) | |

(52) U.S. Cl.
CPC ....... *G06K 9/00422* (2013.01); *G06K 9/4604* (2013.01); *G06K 9/52* (2013.01); *G06K 9/6218* (2013.01); *G06T 3/40* (2013.01); *G06T 7/0085* (2013.01); *G06T 2207/20144* (2013.01)

(58) Field of Classification Search
None
See application file for complete search history.

(56) References Cited

U.S. PATENT DOCUMENTS

| | | | | |
|---|---|---|---|---|
| 7,171,056 B2* | 1/2007 | Zhang | .................... | G06K 9/32 382/266 |
| 8,098,936 B2* | 1/2012 | Guerzhoy | ............. | G06T 7/0083 345/441 |
| 8,244,062 B2* | 8/2012 | Dey | .................... | G06K 9/3283 358/3.26 |
| 8,503,813 B2* | 8/2013 | Sun | .......................... | G06K 9/32 358/3.27 |
| 8,861,892 B2* | 10/2014 | Yu | ............................. | G06T 7/00 382/286 |
| 2004/0165786 A1* | 8/2004 | Zhang | .................... | G06K 9/32 382/276 |
| 2007/0268501 A1 | 11/2007 | Jiang et al. | | |

OTHER PUBLICATIONS

Hull, Document Image Skew Detection: Survey and Annotated Bibliography, Document Analysis Systems II, J..J.Hull, S.L.Taylor, Eds., World Scientific, pp. 40-64, 1998.*
Zhang et al, Whiteboard It! Convert Whiteboard Content into an Electronic Document, https://www.microsoft.com/en-us/research/wp-content/uploads/2016/12/Whiteboard-It.pdf, Aug. 12, 2002.*

(Continued)

*Primary Examiner* — Andrae S Allison
(74) *Attorney, Agent, or Firm* — Osha Liang LLP

(57) ABSTRACT

A method for image processing, including: obtaining an image including a writing board and a background external to the writing board; detecting a plurality of lines within the image; determining, based on the plurality of lines, a plurality of corners of the writing board within the image; and correcting a perspective of the writing board by applying a transformation to the image based on the plurality of corners.

20 Claims, 8 Drawing Sheets

(56) References Cited

OTHER PUBLICATIONS

Zhang, Z., "Single-View Geometry of A Rectangle With Application to Whiteboard Image Rectification", 2013, http://research.microsoft.com/en-us/um/people/zhang/Papers/WhiteboardRectification.pdf (7 pages).
Jagannathan, L. et al., "Perspective Correction Methods for Camera Based Document Analysis", Proc. First Int. Workshop on Camera-based Document Analysis and Recognition, 2005, pp. 148-154 (7 pages).
Partial European Search Report in counterpart European Application No. 16 19 6685.8 dated May 18, 2017 (12 pages).
Z. Zhang et al; "Notetaking with a Camera: Whiteboard Scanning and Image Enhancement"; IEEE Meeting, vol. 3, pp. 533-536; May 17, 2004 (4 pages).

* cited by examiner

Image
506

Whiteboard
508

Image
(Following line
detection)
510

WRITING BOARD DETECTION AND CORRECTION

BACKGROUND

Writing boards (e.g., whiteboards, blackboards, etc.) are frequently used in many different settings (e.g., academic, corporate, non-profit, residential, etc.). Text, drawings, charts, graphs, etc. may be placed on writing boards to communicate ideas during lectures, training, brainstorming sessions, etc. In order to electronically memorialize these ideas, a photograph of the writing board may be taken and image processing (e.g., optical character recognition (OCR)) may be executed to extract the contents of the writing board from the image.

When the photograph is taken (e.g., using a smart phone with a camera), the resulting image may include the background external to the writing board. Further, the resulting image may also capture the writing board with a distorted perspective. Both the background and the distorted perspective complicate the image processing and make successful extraction of the contents less likely. However, users still wish to memorialize the ideas on a writing board by photographing the writing board.

SUMMARY

In general, in one aspect, the invention relates to a method for image processing. The method comprises: obtaining an image comprising a writing board and a background external to the writing board; detecting a plurality of lines within the image; determining, based on the plurality of lines, a plurality of corners of the writing board within the image; and correcting a perspective of the writing board by applying a transformation to the image based on the plurality of corners.

In general, in one aspect, the invention relates to a non-transitory computer readable medium (CRM) storing computer readable program code for image processing. The computer readable program code: obtains an image comprising a writing board and a background external to the writing board; detects a plurality of lines within the image; determines, based on the plurality of lines, a plurality of corners of the writing board within the image; and corrects a perspective of the writing board by applying a transformation to the image based on the plurality of corners.

In general, in one aspect, the invention relates to a system for image processing. The system comprises: a buffer that stores an image comprising a writing board and a background external to the writing board; a line processor that detects a plurality of lines within the image; a corner detector that determines, based on the plurality of lines, a plurality of corners of the writing board within the image; and a correction engine that corrects a perspective of the writing board by applying a transformation to the image based on the plurality of corners.

Other aspects of the invention will be apparent from the following description and the appended claims.

DETAILED DESCRIPTION

Figure 1:
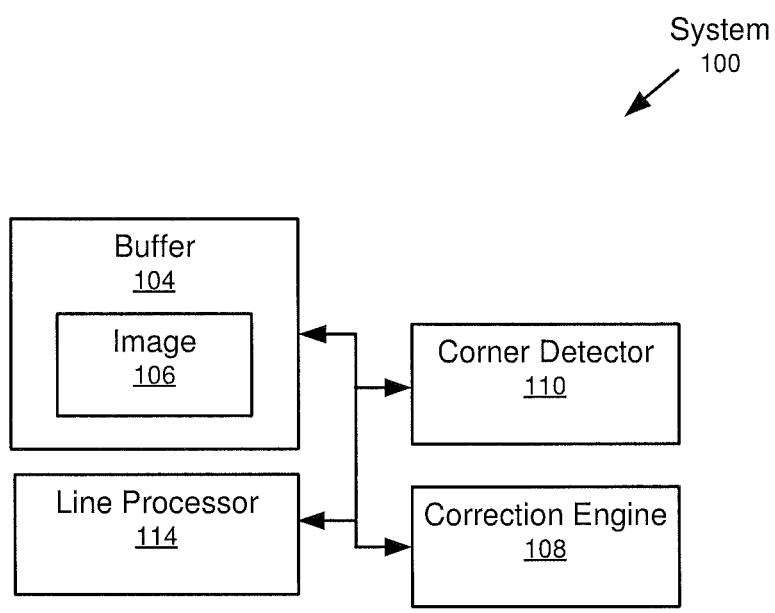
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method, a non-transitory computer readable medium (CRM), and a system for image processing. An image including a writing board and at least a portion of the background external to the writing board is obtained. Then, the lines (e.g., edges) within the image are detected. Lines that are located on the writing board in the image and lines that are located in the background of the image are identified and removed (i.e., excluded from further consideration). Some of the remaining lines are used to determine the corners of the writing board and to calculate a transformation that offsets the distorted perspective of the writing board. Once the distorted perspective of the writing board is corrected by applying the transformation to the image, additional image processing (e.g., OCR) may be executed to extract the contents of the writing board. By first correcting, at least partially, the distorted perspective of the writing board in the writing board, it is more likely that the subsequent image processing (e.g., OCR) will be successful.

FIG. 1 shows a system (100) in accordance with one or more embodiments of the invention. As shown in FIG. 1, the system (100) has multiple components (e.g., a buffer (104), a line processor (114), a corner detector (110), and a correction engine (108)). Each of these components (104, 108, 110, 114) may be located on the same computing device (e.g., personal computer (PC), laptop, tablet PC, smart phone, server, mainframe, cable box, kiosk, etc.) or may be located on different computing devices connected by a network of any size and any topology having wired and/or wireless segments.

In one or more embodiments of the invention, the system (100) includes the buffer (104). The buffer (104) may be implemented in hardware (i.e., circuitry), software, or any combination thereof. The buffer (106) stores an image (106). The image (106) includes a writing board and a background. The background of the image (106) is effectively any area of the image (106) that is not occupied by the writing board. The image (106) may capture the writing board with a distorted perspective. The image (106) may be obtained from any source. For example, the image (106) may be obtained from a digital camera in a smart phone (not shown). As another example, the image (106) may be obtained over a network (e.g., the Internet) (not shown). As yet another example, the image (106) may be obtained from a hard drive (not shown). The image (106) may be of any size and any resolution. In one or more embodiments of the invention, the buffer (104) may downsample the image (106). Specifically, the buffer (104) may downsample the image (106) if the resolution of the image exceeds a predetermined threshold (e.g., the image (106) is in high definition). The buffer (104)

may store the image (106) while other components (e.g., 108, 110, 114) operate on the image (106).

In one or more embodiments of the invention, the system (100) includes the line processor (114). The line processor (114) may be implemented in hardware (i.e., circuitry), software, or any combination thereof. The line processor (114) is configured to perform edge detection on the image (106). In other words, the line processor (114) is configured to detect lines within the image (106). For example, the line processor (114) may utilize the Canny algorithm and/or the Hough Transform to detect the lines in the image (106). The line processor (114) may also remove (i.e., exclude from future consideration) lines that are not sufficiently long (i.e., lines that do not exceed a length threshold). The line processor (114) may also classify each line as being closer to vertical or closer to horizontal.

Those skilled in the art, having the benefit of this detailed description, will appreciate that one or more detected lines may be located on the writing board in the image, one or more detected lines may be located in the background external to the writing board in the image, and one or more detected lines may correspond to the outline (e.g., border, perimeter, etc.) of the writing board in the image (106).

In one or more embodiments of the invention, the line processor (114) identifies and removes (i.e., excludes from future consideration) lines that are located on the writing board in the image (106). Those skilled in the art, having the benefit of this detailed description, will appreciate that if a line is on the writing board, it is likely that the pixels on both sides of the line may have similar intensity values. Accordingly, the line processor (114) may compare the intensity values of the pixels on both sides of the line to determine the selected line is on the writing board. This process may include the use of strips (discussed below).

In one or more embodiments of the invention, the line processor (114) identifies and removes (i.e., excludes from further consideration) lines that are located in the background of the image. Specifically, the line processor (114) may calculate multiple sample points on a selected line and generate links from a reference point (e.g., the center of the image) to each sample point. If the links intersect other lines before reaching the sample point, it may be determined that the selected line is located in the background of the image (106) (discussed below).

In one or more embodiments, the system (100) includes the corner detector (110). The corner detector (110) may be implemented in hardware (i.e., circuitry), software, or any combination thereof. The corner detector (114) is configured to determine the corners of the writing board in the image (106). This may include partitioning the remaining lines into four clusters based on the normal orientations from the image center. Within each cluster, lines may be ranked based on various factors including length and proximity to the center of the image (106). Four lines, one from each of the four clusters, may be selected based on rank, and then the cross points (i.e., intersections) of the four lines are calculated. Assuming the calculated cross points do not violate a quadrangle principle (discussed below), the four cross points are deemed to be the corners of the writing board in the image (106).

In one or more embodiments of the invention, the system (100) includes the correction engine (108). The correction engine (108) may be implemented in hardware (i.e., circuitry), software, or any combination thereof. The correction engine (108) is configured to calculate a transformation based on the calculated intersections and the distances between the four lines (discussed below). The correction engine (108) is also configured to apply the transformation to the image (106) in order to offset (i.e., at least partially correct) the distorted perspective of the writing board in the image (106) (discussed below). Those skilled in the art, having the benefit of this detailed description, will appreciate that by offsetting the distorted perspective, it is more likely that any additional processing (e.g., OCR) applied to the image (106) will be successful in extracting the contents of the writing board in the image (106).

Although FIG. 1 shows the system (100) as having four components (104, 108, 110, 114), in other embodiments, the system (100) may have more or fewer components. For example, the system (100) may include a smart phone with a digital camera to capture the image (106). As another example, the system (100) may include addition engines to perform additional processing (e.g., OCR) on the image (106) to extract the contents of the writing board in the image (106).

Figure 2:
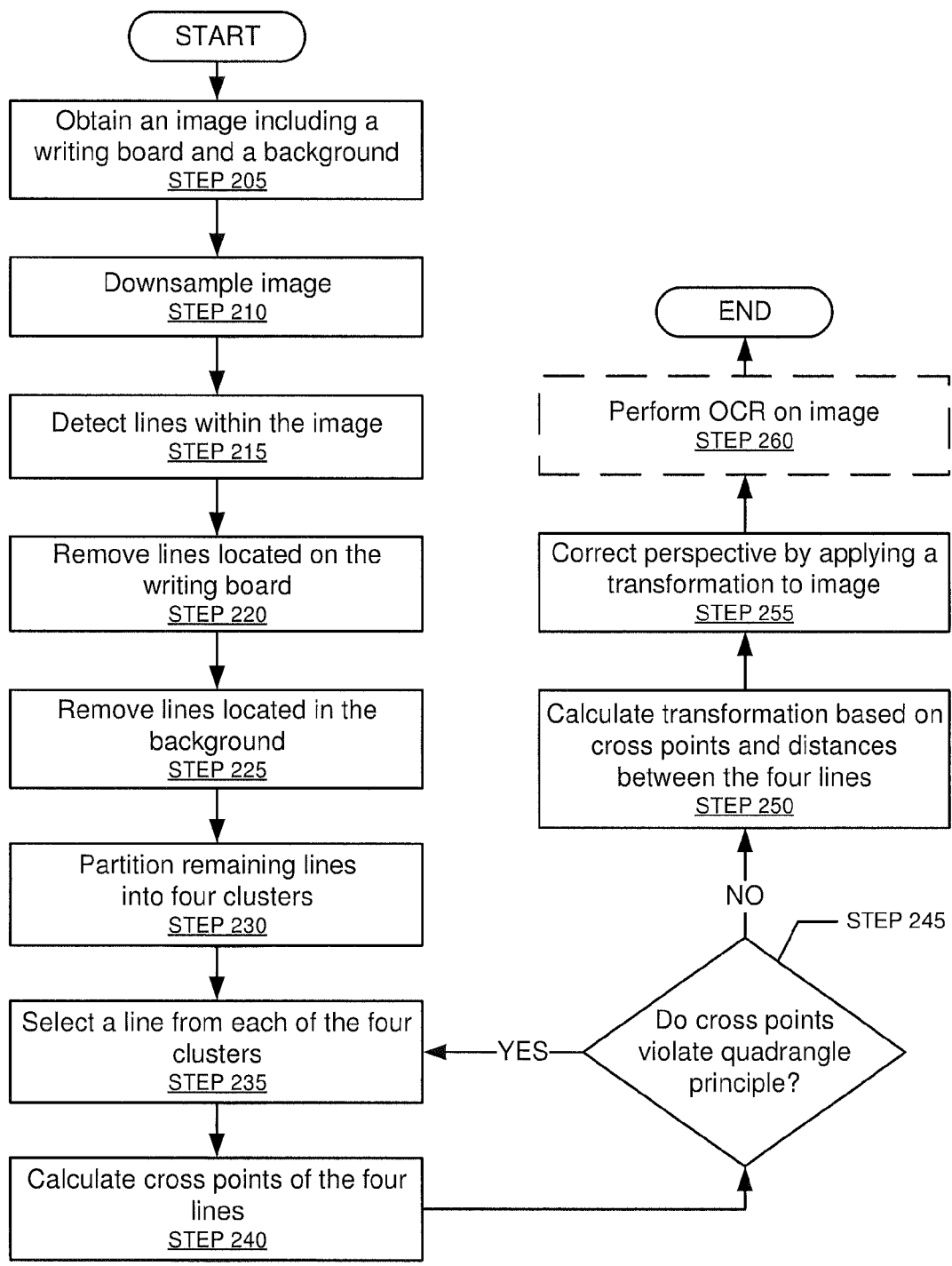
FIGS. 2-4 show flowcharts in accordance with one or more embodiments of the invention.

FIG. 2 shows a flowchart in accordance with one or more embodiments of the invention. The flowchart depicts a process for image processing. One or more of the steps in FIG. 2 may be performed by the components of the system (100), discussed above in reference to FIG. 1. In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Initially, an image is obtained (STEP 205). The image may be obtained from a digital camera. The image may be downloaded from a server. The image may include a writing board (e.g., a whiteboard, a blackboard, etc.). The writing board may occupy the center of the image. The image may also include a background that is external to the writing board. The background may appear on some or all four sides of the writing board.

In STEP 210, the image may be downsampled to enhance the linearity of the edges. Those skilled in the art, having the benefit of this detailed description, will appreciate that STEP 210 may be optional.

In STEP 215, lines are detected in the image. The lines may be detected by applying a line detection algorithm. For example, the lines of the image may be detected by applying the Canny algorithm and/or the Hough Transform to the image. Other algorithms for line detection may also be applied. Any detected line that does not exceed a length threshold (i.e., short lines) may be removed (i.e., excluded from further consideration).

Those skilled in the art, having the benefit of this detailed description, will appreciate that one or more detected lines may be located on the writing board in the image, one or more detected lines may be located in the background external to the writing board in the image, and one or more detected lines may correspond to the border of the writing board.

In STEP 220, lines located on the writing board in the image are identified and removed (i.e., excluded from future consideration). Additional details regarding STEP 220 may be found, for example, in FIG. 3 and in FIG. 5C.

In STEP 225, lines located on the background of the image are identified and removed (i.e., excluded from future consideration). Additional details regarding STEP 225 may be found, for example, in FIG. 4 and in FIG. 5D.

In STEP 230, the remaining lines are partitioned into four clusters based on the normal orientations from the image center. Within each cluster, the lines may be ranked. For example, the lines may be ranked in terms of length and/or proximity to the center of the image. A cluster having only one line is possible.

In STEP 235, a line is selected from each of the four clusters resulting in a set of four lines. The selection may be at random. In other words, a line may be selected at random from each cluster. Additionally or alternatively, a line may be selected from each cluster based on the rank of the line in the cluster. For example, the highest ranked line may be selected from each cluster. As another example, the lowest ranked line may be selected from each cluster.

In STEP 240, the cross points (i.e., intersections) of the four lines are calculated. Those skilled in the art, having the benefit of this detailed description, will appreciate that calculating the cross points of the four lines may include extending one or more of the four lines until they intersect with the other lines. Those skilled in the art, also having the benefit of this detailed description, will appreciate that there will be four cross points and each cross point may be represented with coordinates.

In STEP 245, it is determined whether the calculated cross points violate a quadrangle principle. The quadrangle principle is violated if one or more of the calculated cross points are located close (i.e., within a predetermined distance) to the center of the line segments. Additionally or alternatively, the quadrangle principle is violated if two cross points in a line are on the one side of the line. Said in a different way, as discussed above, in order to calculate cross points, a line may be extended in both directions (extension in direction A, extension in direction B) to intersect with the other lines. If both cross points in a line are located in the same extension of the line (i.e., both located in the extension in direction A or both located in the extension in direction B), then the quadrangle principle is violated. When it is determined that the calculated cross points do not violate the quadrangle principle, the process proceeds to STEP 250. The cross points are deemed to be the four corners of the writing board in the image. However, when it is determined that the calculated cross points do violate the quadrangle principle, the process returns to STEP 235, where at least one line of the set of lines is replaced with a different line from the same cluster.

In STEP 250, a transformation is calculated based on the cross-points and the distances between the four lines. For example, let w be the distance between the midpoint of one vertical line and the midpoint of the other vertical line in the set of four lines. Further, let h be the distance between the midpoint of one horizontal line and the midpoint of the other horizontal line in the set of four lines. The transformation may be an affine transformation that maps the coordinates of the cross points to the following coordinates: (0, 0), (w, 0), (0, h), and (w, h). Those skilled in the art, having the benefit of this detailed description, will appreciate that w/h is used as the aspect ratio.

In STEP 255, the distorted perspective is at least partially corrected by applying the transformation to the image. Following application of the transformation, it is more likely that any processing (e.g., OCR) performed on the image to extract the contents of the writing board in the image will be successful (STEP 260). Those skilled in the art, having the benefit of this detailed description, will appreciate that STEP 260 is optional.

Figure 3:
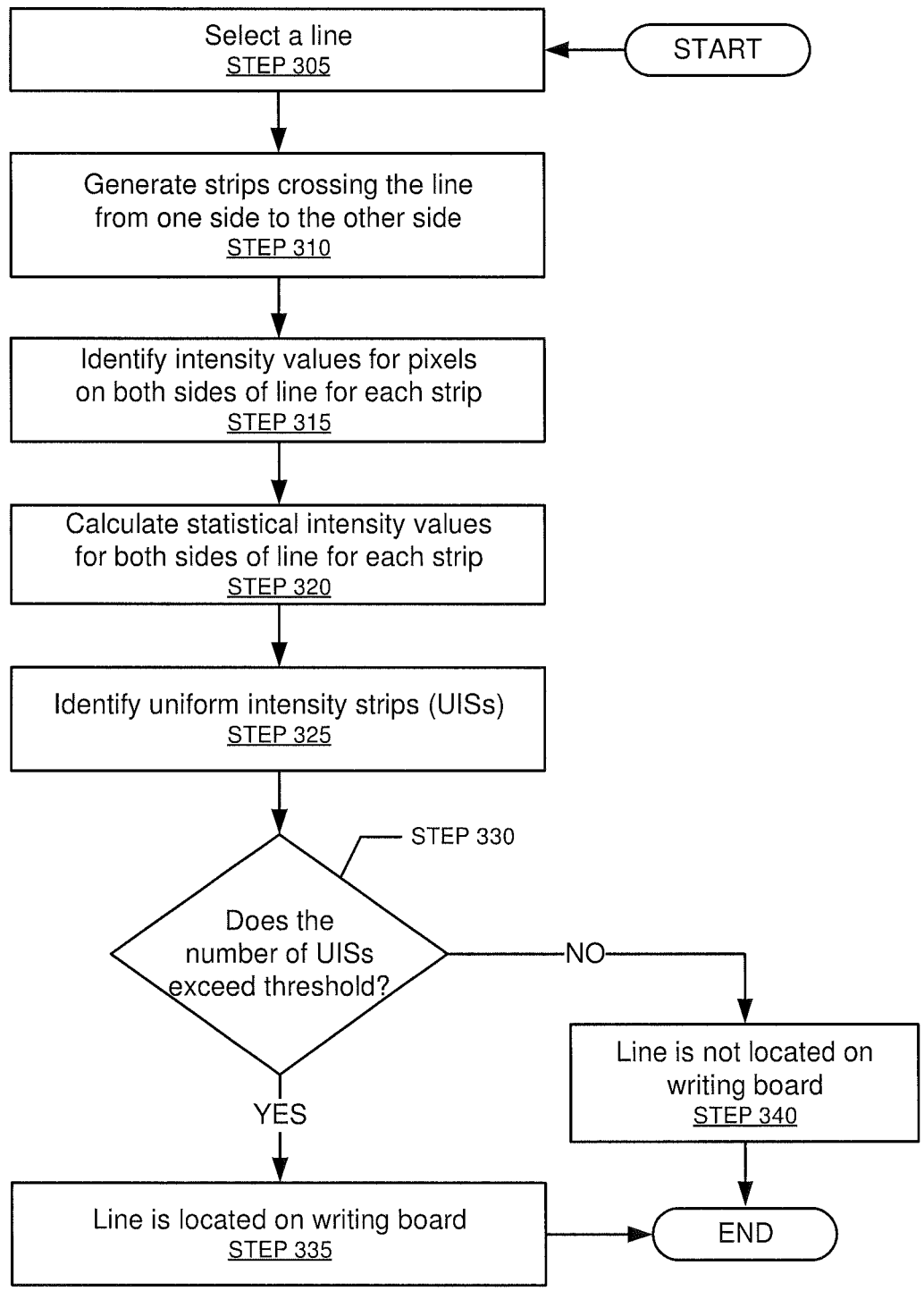

FIG. 3 shows a flowchart in accordance with one or more embodiments of the invention. The flowchart depicts a process for identifying lines that are located on a writing board in an image. One or more of the steps in FIG. 3 may be performed by the components of the system (100), discussed above in reference to FIG. 1. In one or more embodiments of the invention, one or more of the steps shown in FIG. 3 may be omitted, repeated, and/or performed in a different order than the order shown in FIG. 3. Accordingly, the scope of the invention should not be considered limited to the specific arrangement of steps shown in FIG. 3. Further, the process shown in FIG. 3 may correspond to STEP 220, discussed above in reference to FIG. 2.

Initially, one of the detected lines in the image is selected (STEP 305). The line may be selected at random from all the detected lines. Additionally or alternatively, the line may be selected because it is the longest line, it is the shortest line, it is the closest to the center of the image, it is the farthest from the center of the image, etc.

In STEP 310, multiple strips are generated for the line. If the line is classified as vertical, the strips are horizontal. If the line is classified as horizontal, the strips are vertical. The strips cross from one side of the line to the other side of the line. Each strip includes multiple pixels (e.g., 2, 3, 10, etc.) from each side of the line. For example, if the line is classified as vertical, each strip is horizontal and may include 3 pixels from the left side of the line and 3 pixels from the right side of the line. As another example, if the line is classified as horizontal, each strip is vertical and may include 3 pixels below the line and 3 pixels above the line.

In STEP 315, intensity values for pixels on both sides of the line are identified for each strip. For a given strip, these intensity values may be sorted for each side of the line. For example, in a horizontal strip, the intensity values for the pixels on the left side of the line may be sorted amongst themselves, and the intensity values for the pixels on the right side of the line may be sorted amongst themselves.

In STEP 320, statistical intensity values are calculated for both sides of the line on a strip by strip basis. For example, the statistical intensity value may correspond to the mean or median intensity value among the pixels located on one side of the line in a strip. Additionally or alternatively, the statistical intensity values may correspond to the 40% intensity value ($I_{40}$) and the 60% intensity value ($I_{60}$) of the pixels located on one side of the line in a strip.

In STEP 325, uniform intensity strips (UISs) are identified. A UIS is a strip where the statistical intensity value for one side of the line matches (i.e., equals or approximately equals) the statistical intensity value for the other side of the line. For example, in the case of a horizontal strip, if the $I_{40}$ and $I_{60}$ values of the pixels on the left side of the line match the $I_{40}$ and the $I_{60}$ values, respectively, of the pixels on the right side of the line, the strip is deemed to be a UIS. As another example, in the case of a vertical strip, if the median intensity value of the pixels on top of the line in the strip matches the median intensity value of the pixels below the line in the strip, the strip is deemed to be a UIS.

In STEP 330, it is determined if the number of identified UISs (i.e., the cardinality of identified UISs) exceeds a threshold. For example, the threshold may be ⅓ of all the strips for the selected line. When it is determined that the number of identified UISs exceeds the threshold, the line is deemed as being located on the writing board in the image (STEP 335). However, when the number of UISs does not exceed the threshold, the line is deemed as not being located on the writing board in the image (STEP 340).

Those skilled in the art, having the benefit of this detailed description, will appreciate that the process depicted in FIG. 3 may be repeated for each detected line in the image that has not been removed (i.e., excluded from further consideration). In other words, the process depicted in FIG. 3 may be repeated multiple times.

Figure 4:
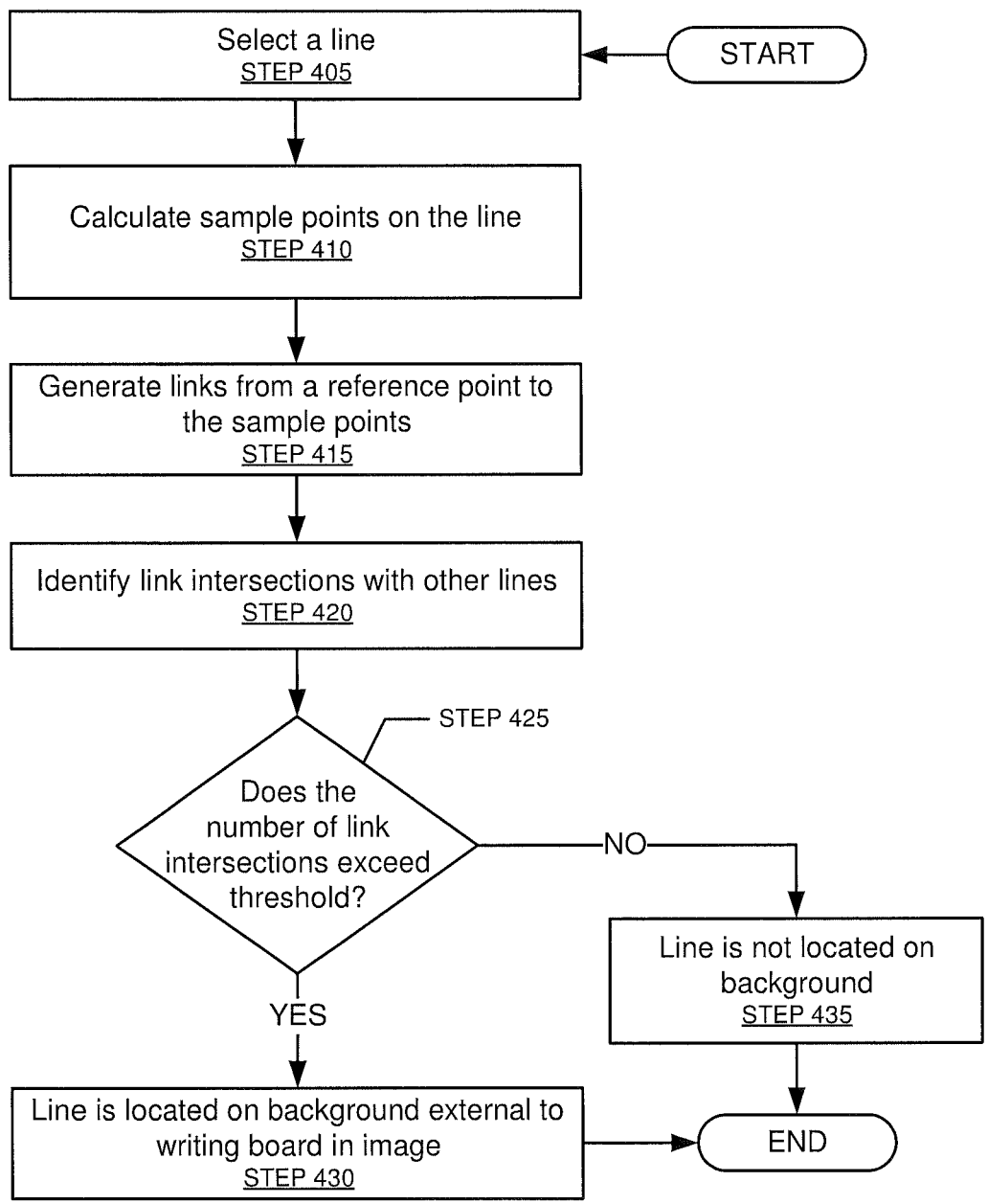

FIG. 4 shows a flowchart in accordance with one or more embodiments of the invention. The flowchart depicts a process for identifying lines that are located in the background external to a writing board in an image. One or more of the steps in FIG. 4 may be performed by the components of the system (100), discussed above in reference to FIG. 1. In one or more embodiments of the invention, one or more of the steps shown in FIG. 4 may be omitted, repeated, and/or performed in a different order than the order shown in FIG. 4. Accordingly, the scope of the invention should not be considered limited to the specific arrangement of steps shown in FIG. 4. Further, the process shown in FIG. 4 may correspond to STEP 225, discussed above in reference to FIG. 2.

Initially, one of the detected lines in the image is selected (STEP 405). The line may be selected at random from all the detected lines. Additionally or alternatively, the line may be selected because it is the longest line, it is the shortest line, it is the closest to the center of the image, it is the farthest from the center of the image, etc.

In STEP 410, multiple sample points are calculated for the selected line. In one or more embodiments, the number of sample points is based on the length of the line. If the selected line has a length of L, sample points are placed at L/10 intervals (or L/2 intervals, L/4 intervals, L/5 intervals, L/8 intervals, L/16 intervals, etc.) on the selected line. Additionally or alternatively, a fixed number of sample points may be used regardless of the length of the selected line. The sample points may be spaced at random distances along the selected line. Additionally or alternatively, sample points are only placed at the ends of the selected line.

In STEP 415, links are generated from a reference point to the sample points on the selected line. The links themselves are effectively line segments. The reference point may correspond to the center of the image. Additionally or alternatively, the reference point may be near the center of the image (e.g., located in a small region that includes the center of the image).

In STEP 420, link intersections with other lines are identified. A link intersection is effectively an intersection of a link with another line before the link reaches the sample point of the selected link. Some links may have no link intersections. A single link may have multiple link intersections.

In STEP 425, it is determined whether the total number of link intersections (i.e., the link intersections for all links going from the reference point to the selected line) exceeds a threshold (e.g., 1, 5, 6, 10, 11, etc.). When it is determined that the total number of link intersections exceeds the threshold, the selected line is deemed to be located in the background external to the writing board in the image (STEP 430). When it is determined that the total number of link intersections does not exceed the threshold, the selected line is not deemed to be located in the background (STEP 435).

Those skilled in the art, having the benefit of this detailed description, will appreciate that the process depicted in FIG. 4 may be repeated for each detected line in the image that has not been removed (i.e., excluded from further consideration). In other words, the process depicted in FIG. 4 may be repeated multiple times.

Figure 5A:
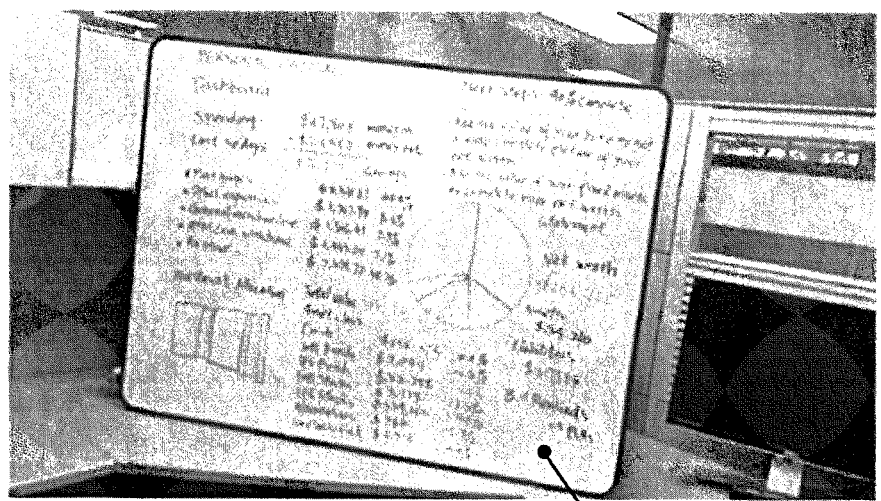
FIGS. 5A-5F show an implementation example in accordance with one or more embodiments of the invention.

FIGS. 5A-5F show an implementation example in accordance with one or more embodiments of the invention. As shown in FIG. 5A, there exists an image (506) with a whiteboard (508). The perspective of the whiteboard (508) in the image (506) is distorted. Performing OCR or other types of image processing on the image (506) would likely produce poor results. In other words, the image processing might not correctly extract the content of the whiteboard (508) from the image (506) because of the distorted perspective.

Figure 5B:
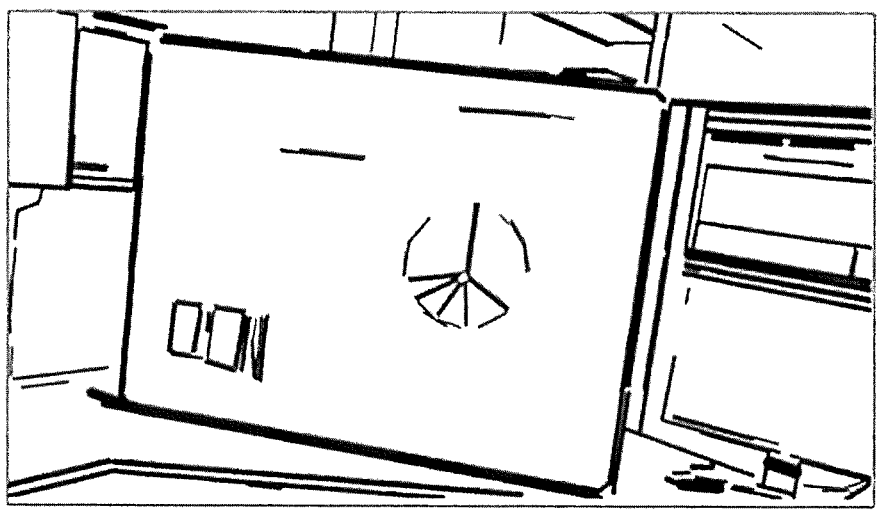

FIG. 5B shows the image (510) after line detection. As shown in FIG. 5B, the detected lines include lines located on the whiteboard (508), lines corresponding to the outline (e.g., perimeter, border) of the whiteboard (508), and lines located in the background external to the whiteboard (508).

Figure 5C:
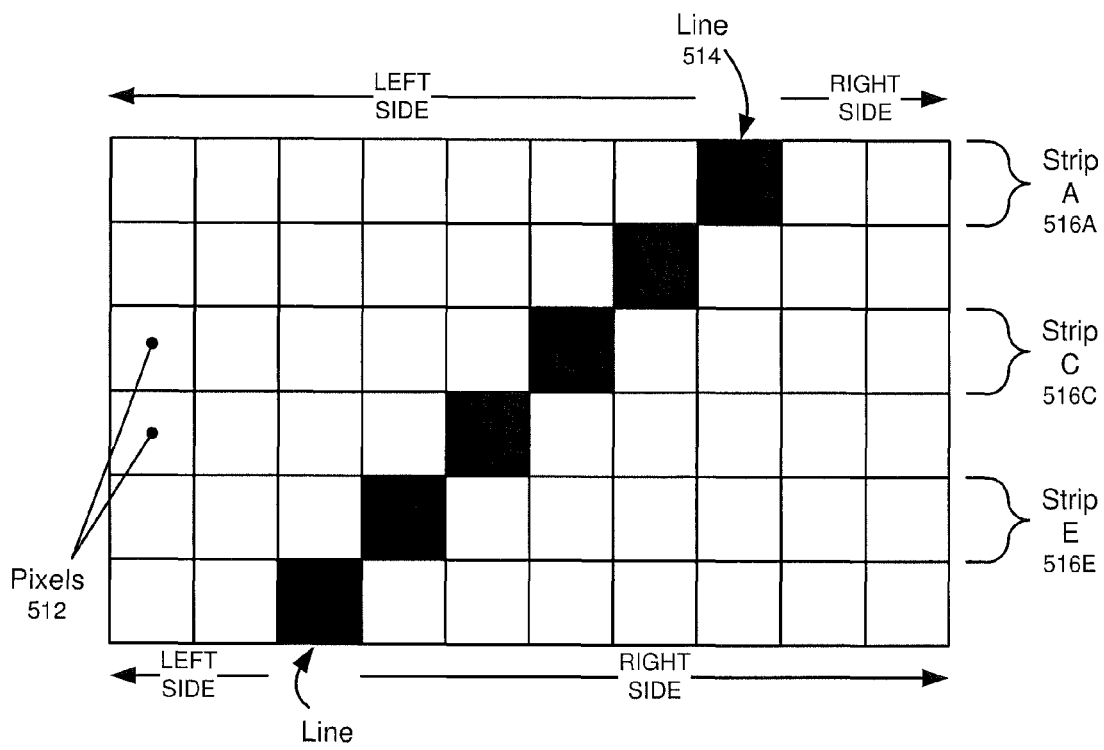

FIG. 5C shows one of the detected lines (514) and multiple generated strips (i.e., Strip A (516A), Strip C (516C), Strip E (516E)). As the line (514) is approximately vertical, the generated strips are horizontal and run from the left side of the line (514) to the right side of the line (514). Each strip (516A, 516C, 516E) includes pixels (512) that are located on the left side of the line (514) and pixels that are located on the right side of the line (514). Consider strip C (516C). One or more statistical intensity values (e.g., $I_{40}$, $I_{60}$) may be calculated for the pixels of strip C (516C) on the left side of the line (514). One or more statistical intensity values (e.g., $I_{40}$, $I_{60}$) may be calculated for the pixels of strip C (516C) on the right side of the line (514). If the statistical intensity values from both sides of the line (514) match, strip C (516C) is deemed to be a uniform intensity strip. If at least a third of all the strips (516A, 516C, 516E, etc.) are uniform intensity strips, the line (514) is deemed to be located on the whiteboard (508) in the image.

Figure 5D:
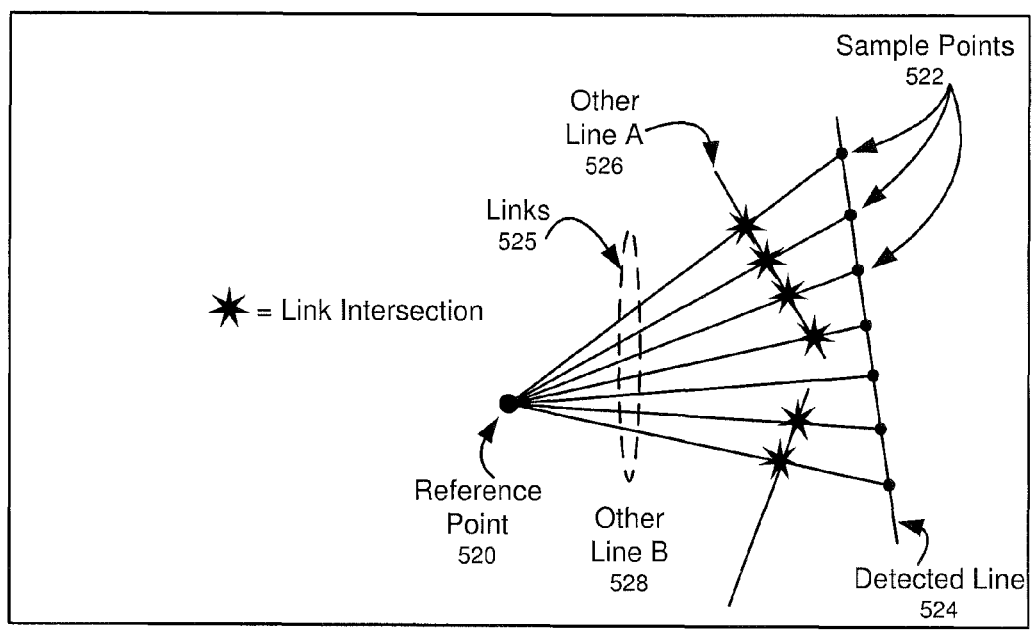

FIG. 5D shows a detected line (524) and a reference point (520) that is near the center of the image. As also shown in FIG. 5D, multiple sample points (522) are calculated for the detected line (524). Multiple links (525) are generated from the reference point (520) to the sample points (522). There are other detected lines (i.e., Other Line A (526), Other Line B (528)) located between the reference point (520) and the detected line (524). Accordingly, some of the links intersect with the other lines (526, 528). As the number of link intersections exceeds a threshold (e.g., 5), the detected line (524) is deemed to be located in the background external to the whiteboard (508) in the image.

Figure 5E:
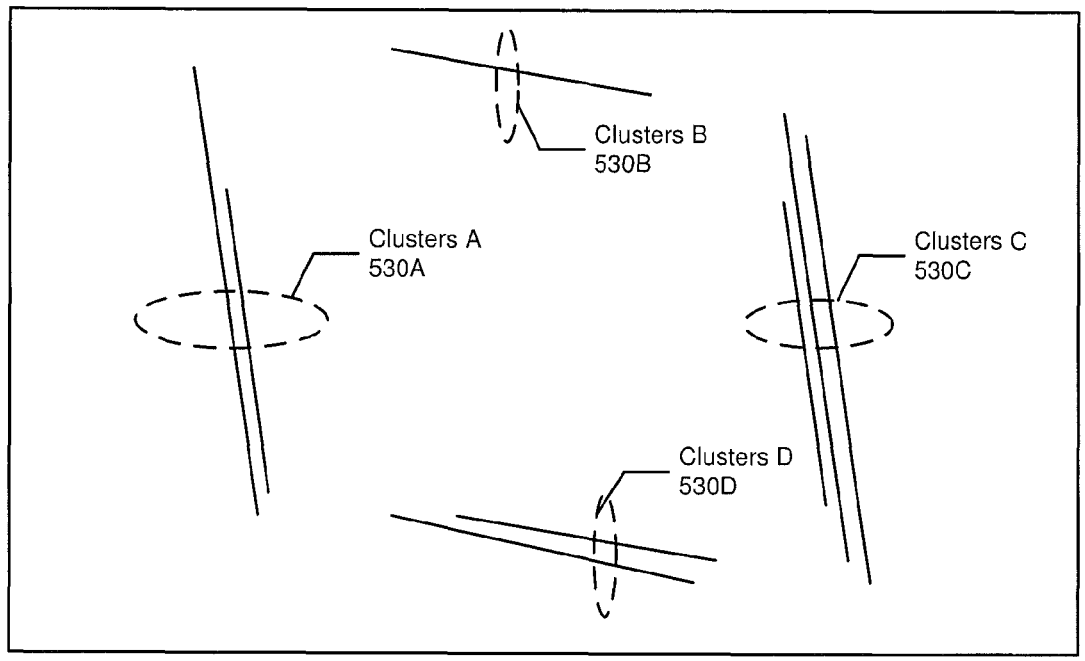

FIG. 5E shows multiple clusters (i.e., cluster A (530A), cluster B (530B), cluster C (530C), and cluster D (530D)). The clusters (530A, 530B, 530C, 530D) include two clusters for horizontal lines (530B, 530D) and two clusters for vertical lines (530A, 530C). Within each cluster (530A, 530B, 530C, 530D) the lines may be ranked according to length, distance from the center of the image, etc. A set of four lines is formed by selecting one line from each of the clusters (530A, 530B, 530C, 530D).

Figure 5F:
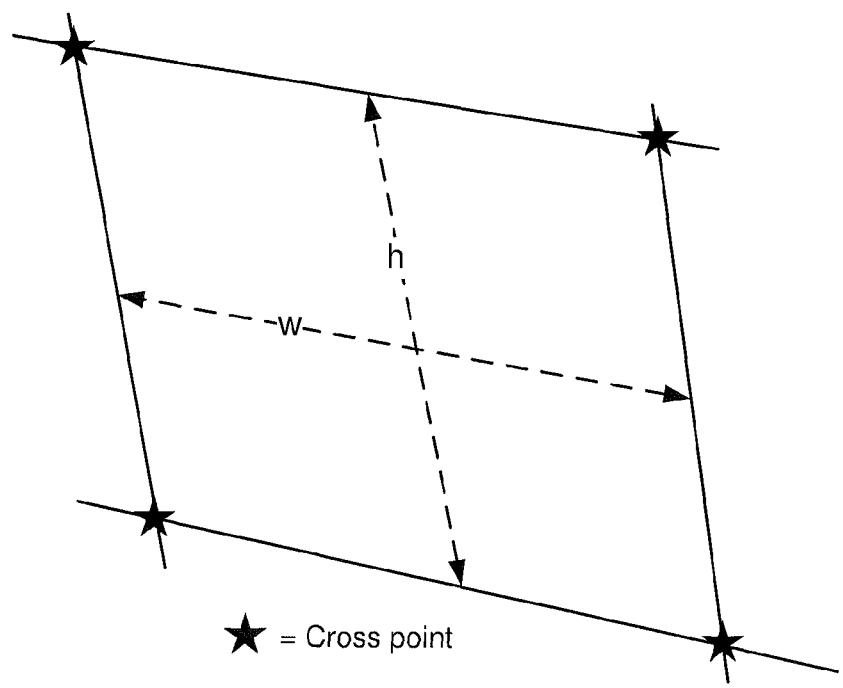

FIG. 5F shows the calculation of cross points for a set of four lines. As the cross points do not violate a quadrangle principle, these cross points are deemed to be the corners of the whiteboard (508) in the image. Accordingly, an affine transformation may be calculate based on the coordinates of the cross points and the distances (w, h) between the four lines. This transformation may be applied to the image to at least partially correct the distorted perspective of the writing board. Following application of the transform, the image is better suited for additional image processing (e.g., OCR) to extract the content of the whiteboard (508).

One or more embodiments of the invention may have the following advantages: the ability to at least partially correct a distorted perspective of a writing board in an image; the ability to identify and remove lines located on the writing board in the image; the ability to identify and remove lines located in the background external to the writing board in the image; the ability to determine a line is located in the background based on link intersections; the ability to determine a line is located on the writing board using statistical intensity values and uniform intensity strips; etc.

Figure 6:
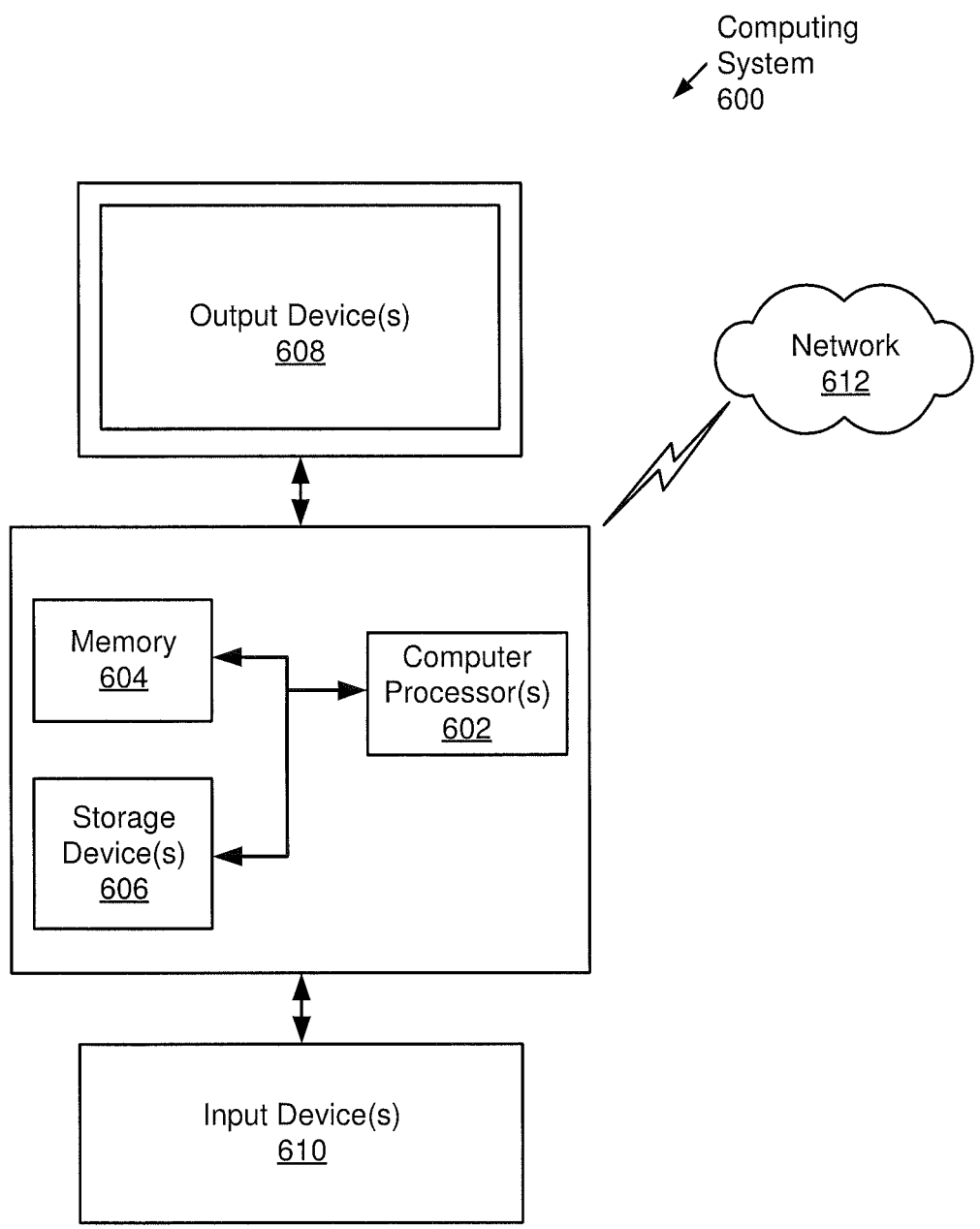
FIG. 6 shows a computer system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 6, the computing system (600) may include one or more computer processor(s) (602), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (600) may be located at a remote location and connected to the other elements over a network (612). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for image processing, comprising:
   obtaining an image comprising a writing board and a background external to the writing board;
   detecting a plurality of lines within the image;
   identifying and removing, from the plurality of lines, a first subset of lines located on the writing board in the image by:
   selecting a first line of the plurality of lines;
   identifying a first plurality of intensity values for a first plurality of pixels on a first side of the first line;
   identifying a second plurality of intensity values for a second plurality of pixels on a second side of the first line;
   determining the first line is located on the writing board based on the first plurality of pixel values and the second plurality of pixel values; and
   removing the first line from the plurality of lines in response to determining the line is located on the writing board;
   identifying and removing, from the plurality of lines, a second subset of lines located in the background of the image;
   determining, based on the plurality of lines after the first subset and the second subset are removed, a plurality of corners of the writing board within the image; and
   correcting a perspective of the writing board by applying a transformation to the image based on the plurality of corners.

2. The method of claim 1, wherein identifying and removing the first subset of lines further comprises:
   generating a plurality of strips crossing the first line from the first side of the first line to the second side of the first line,
   wherein the plurality of strips comprises a strip comprising a subset of the first plurality of pixels and a subset of the second plurality of pixels;
   calculating a first statistical intensity value for the subset of the first plurality of pixels;
   calculating a second statistical intensity value for the subset of the second plurality of pixels;
   generating a comparison of the first statistical intensity value and the second statistical intensity value; and
   determining, based on the comparison, that the strip is a uniform intensity strip,
   wherein determining the first line is located on the writing board comprises comparing a cardinality of the plurality of strips that are uniform intensity strips with a threshold.

3. The method of claim 2, wherein the first side is above the first line, wherein the second side is below the first line, and wherein the threshold is one-third the plurality of strips.

4. The method of claim 1, wherein identifying and removing the second subset of lines comprises:
   selecting a second line of the plurality of lines;
   calculating a plurality of sample points on the second line;
   selecting a reference point within the image;
   generating a plurality of links from the reference point to the plurality of sample points;
   identifying a plurality of link intersections for the plurality of links;

determining the second line is located in the background of the image based on a cardinality of the plurality of link intersections; and removing, before determining the plurality of corners, the second line from the plurality of lines in response to determining the second line is located in the background of the image external to the writing board.

5. The method of claim 4, wherein the reference point is the center of the image.

6. The method of claim 4, wherein the second line has a length, wherein the plurality of sample points are separated by a plurality of intervals, and wherein each of the plurality of intervals is at least one selected from a group consisting of one-tenth, one-fifth, one-fourth, and one-sixteenth of the length of the second line.

7. The method of claim 1, wherein identifying the plurality of corners comprises:
partitioning the plurality of lines into a plurality of clusters, wherein the plurality of clusters has a cardinality of four;
selecting a first set of four lines from the plurality of clusters; and
calculating a first plurality of cross points for the first set of four lines.

8. The method of claim 7, further comprising:
selecting a second set of four lines from the plurality of clusters;
calculating a second plurality of cross points for the second set of four lines; and
determining, before selecting the first set of four lines, that the second plurality of cross points violate a quadrangle principle.

9. The method of claim 7, further comprising:
calculating the transformation based on the first plurality of cross points and a plurality of distances between the first set of four lines.

10. The method of claim 1, further comprising:
downsampling the image before identifying the plurality of lines,
wherein the writing board is a whiteboard.

11. A non-transitory computer readable medium (CRM) storing computer readable program code embodied therein that:
obtains an image comprising a writing board and a background external to the writing board;
detects a plurality of lines within the image;
identifies and removes, from the plurality of lines, a first subset of lines located on the writing board in the image by:
selecting a first line of the plurality of lines;
identifying a first plurality of intensity values for a first plurality of pixels on a first side of the first line;
identifying a second plurality of intensity values for a second plurality of pixels on a second side of the first line;
determining the first line is located on the writing board based on the first plurality of pixel values and the second plurality of pixel values; and
removing the first line from the plurality of lines in response to determining the line is located on the writing board;
identifies and removes, from the plurality of lines, a second subset of lines located in the background of the image;
determines, based on the plurality of lines after the first subset and the second subset are removed, a plurality of corners of the writing board within the image; and corrects a perspective of the writing board by applying a transformation to the image based on the plurality of corners.

12. The non-transitory CRM of claim 11, wherein identifying and removing the first subset of lines further comprises:
generating a plurality of strips crossing the first line from the first side of the first line to the second side of the first line,
wherein the plurality of strips comprises a strip comprising a subset of the first plurality of pixels and a subset of the second plurality of pixels;
calculating a first statistical intensity value for the subset of the first plurality of pixels;
calculating a second statistical intensity value for the subset of the second plurality of pixels;
generating a comparison of the first statistical intensity value and the second statistical intensity value; and
determining, based on the comparison, that the strip is a uniform intensity strip,
wherein determining the first line is located on the writing board comprises comparing a cardinality of the plurality of strips that are uniform intensity strips with a threshold.

13. The non-transitory CRM of claim 11, wherein identifying and removing the second subset of lines comprises:
selecting a second line of the plurality of lines;
calculating a plurality of sample points on the second line;
selecting a reference point within the image;
generating a plurality of links from the reference point to the plurality of sample points;
identifying a plurality of link intersections for the plurality of links;
determining the second line is located in the background in the image based on a cardinality of the plurality of link intersections; and
removing, before determining the plurality of corners, the second line from the plurality of lines in response to determining the second line is located in the background and external to the writing board.

14. The non-transitory CRM of claim 11, further storing computer readable program code embodied therein that:
partitions the plurality of lines into a plurality of clusters, wherein the plurality of clusters has a cardinality of four;
selects a first set of four lines from the plurality of clusters;
calculates a first plurality of cross points for the first set of four lines;
determines that the first plurality of cross points violate a quadrangle principle;
selects a second set of four lines from the plurality of clusters after determining that the first plurality of cross points violate the quadrangle principle;
calculates a second plurality of cross points for the second set of four lines; and
calculates the transformation based on the second plurality of cross points and a plurality of distances between the second set of four lines.

15. A system for image processing, comprising:
a memory; and
a processor connected to the memory that:
obtains an image comprising a writing board and a background external to the writing board;
detects a plurality of lines within the image;

identifies and removes, from the plurality of lines, a first subset of lines located on the writing board in the image by:
- selecting a first line of the plurality of lines;
- identifying a first plurality of intensity values for a first plurality of pixels on a first side of the first line;
- identifying a second plurality of intensity values for a second plurality of pixels on a second side of the first line;
- determining the first line is located on the writing board based on the first plurality of pixel values and the second plurality of pixel values; and
- removing the first line from the plurality of lines in response to determining the line is located on the writing board;

identifies and removes, from the plurality of lines, a second subset of lines located in the background of the image;

determines, based on the plurality of lines after the first subset and the second subset are removed, a plurality of corners of the writing board within the image; and corrects a perspective of the writing board by applying a transformation to the image based on the plurality of corners.

16. The system of claim 15, wherein identifying and removing the first subset of lines further comprises:
- generating a plurality of strips crossing the first line from a first side of the line to a second side of the first line, wherein the plurality of strips comprises a strip comprising a subset of the first plurality of pixels and a subset of the second plurality of pixels;
- calculating a first statistical intensity value for the subset of the first plurality of pixels;
- calculating a second statistical intensity value for the subset of the second plurality of pixels;
- generating a comparison of the first statistical intensity value and the second statistical intensity value; and
- determining, based on the comparison, that the strip is a uniform intensity strip,
- wherein determining the first line is located on the writing board comprises comparing a cardinality of the plurality of strips that are uniform intensity strips with a threshold.

17. The system of claim 15, wherein identifying and removing the second subset of lines comprises:
- selecting a second line of the plurality of lines;
- calculating a plurality of sample points on the second line;
- selecting a reference point within the image;
- generating a plurality of links from the reference point to the plurality of sample points;
- identifying a plurality of link intersections for the plurality of links;
- determining the second line is located in the background in the image based on a cardinality of the plurality of link intersections; and
- removing, before the plurality of corners are detected, the second line from the plurality of lines in response to determining the second line is located in the background and external to the writing board.

18. The system of claim 15, wherein the processor also:
- partitions the plurality of lines into a plurality of clusters, wherein the plurality of clusters has a cardinality of four;
- selects a first set of four lines from the plurality of clusters;
- calculates a first plurality of cross points for the first set of four lines;
- determines that the first plurality of cross points violate a quadrangle principle;
- selects a second set of four lines from the plurality of clusters after determining that the first plurality of cross points violate the quadrangle principle; and
- calculates a second plurality of cross points for the second set of four lines.

19. The system of claim 18, wherein processor also:
- calculates the transformation based on the second plurality of cross points and a plurality of distances between the second set of four lines.

20. A method for image processing, comprising:
- obtaining an image comprising a writing board and a background external to the writing board;
- detecting a plurality of lines within the image;
- identifying and removing, from the plurality of lines, a first subset of lines located on the writing board in the image;
- identifying and removing, from the plurality of lines, a second subset of lines located in the background of the image by:
  - selecting a line of the plurality of lines;
  - calculating a plurality of sample points on the line;
  - selecting a reference point within the image;
  - generating a plurality of links from the reference point to the plurality of sample points;
  - identifying a plurality of link intersections for the plurality of links;
  - determining the line is located in the background of the image based on a cardinality of the plurality of link intersections; and
  - removing the line from the plurality of lines in response to determining the line is located in the background of the image external to the writing board;
- determining, based on the plurality of lines after the first subset and the second subset are removed, a plurality of corners of the writing board within the image; and
- correcting a perspective of the writing board by applying a transformation to the image based on the plurality of corners.

\* \* \* \* \*